(12) United States Patent
Noll et al.

(10) Patent No.: US 6,417,779 B1
(45) Date of Patent: Jul. 9, 2002

(54) DISPLAY HAVING A TRANSILLUMINABLE DISPLAY PANEL

(75) Inventors: Heinrich Noll, Gross-Umstadt; Hermann Janssen, Aschaffenburg, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/626,840

(22) Filed: Jul. 27, 2000

(30) Foreign Application Priority Data

Jul. 29, 1999 (DE) ............................. 199 35 386

(51) Int. Cl.⁷ ................................. G08B 5/00
(52) U.S. Cl. ..................... 340/815.65; 340/815.45; 340/815.55; 349/106; 362/27
(58) Field of Search ................. 340/463, 464, 340/467, 468, 469, 470, 471, 472, 815.4, 815.43, 815.44, 815.45, 815.55, 815.56, 815.65; 349/106, 113, 114, 122; 362/27, 30, 31, 489

(56) References Cited

U.S. PATENT DOCUMENTS

| | | | |
|---|---|---|---|
| 4,630,894 A | * 12/1986 | Cremers | 349/106 |
| 5,695,269 A | * 12/1997 | Lippmann et al. | 362/27 |
| 5,975,728 A | * 11/1999 | Weyer | 362/489 |
| 6,100,943 A | * 8/2000 | Koide et al. | 349/11 |

FOREIGN PATENT DOCUMENTS

| | | |
|---|---|---|
| DE | 2613024 | 9/1977 |
| DE | 19702957 | 8/1998 |
| DE | 19705536 | 8/1998 |
| EP | 0803711 | 10/1997 |

* cited by examiner

*Primary Examiner*—Van Trieu
(74) *Attorney, Agent, or Firm*—Martin A. Farber

(57) ABSTRACT

The invention relates displays (1), in particular for a motor vehicle, having a transilluminable display panel (2) and an illuminating device (4), arranged on the rear side of the display panel (2) averted from an observer, for transilluminating the display panel. In order to create a compact display (1) the illuminating device (4) can emit light of a first and/or a second wavelength region, and the light of the first wavelength region can essentially pass through only a first region (7, 7a) of the display panel (2), and the light of the second wavelength region can essentially pass through only a second region (8, 8a) of the display panel (2) which differs at least partially from the first region (7, 7a) of the display panel (2), or a light filter is arranged between the illuminating device and the display field, and the light of the first wavelength region can pass essentially only through a first region of the light filter, and the light of the second wavelength region can pass essentially only through a second region of the light filter differing at least partially from the first region of the light filter.

48 Claims, 4 Drawing Sheets

DISPLAY HAVING A TRANSILLUMINABLE DISPLAY PANEL

FIELD AND BACKGROUND OF THE INVENTION

The invention relates to a display, in particular for a motor vehicle, having a transilluminable display panel and an illuminating device, arranged on the rear side of the display panel averted from an observer, for transilluminating the display panel.

Such a display is known and is used, in particular, in motor vehicles for visualizing warning signals or operating states of the most varied devices. In this case, a dedicated, separate display panel is provided for displaying a warning function or monitoring function, respectively. In order to avoid leakage of light between the individual display panels, which impairs the readability of the display, each warning field or monitoring field has a dedicated light source with a focusing hood, which prevents the abovementioned leakage of light. The use of aids such as, for example, an antiskid system, occupant airbags, traction control, which has risen considerably in the case of modern motor vehicles, in particular, has necessitated a correspondingly high number of monitoring panels. This has rendered necessary both a large area requirement for the display and a high structural outlay on its illumination.

Moreover, it is known to undertake visualization of warnings and indications by means of active, freely drivable display panels, or via projection mechanisms. Such devices are of complicated design, require a substantial installation space and have a comparatively high weight.

SUMMARY OF THE INVENTION

In order to provide a remedy here, it is the object of the invention to create a display having a transilluminable display panel, which offers a large range of information and also means of detection and good readability in conjunction with a simple and compact design with few components.

According to the invention, this object is achieved, on the one hand, by virtue of the fact that the illuminating device can emit light of a first and/or a second wavelength region, and in that the light of the first wavelength region can essentially pass through only a first region of the display panel, and the light of the second wavelength region can essentially pass through only a second region of the display panel which differs at least partially from the first region of the display panel. In this case, a slight residual transmission of light in a region through which it cannot pass can, if appropriate, be permissible in order to keep the production cost of the display low.

By contrast with the display known from the prior art, a plurality of warning functions or monitoring functions can be represented in a simple way in a single display panel with the aid of the invention. In this case, different items of information can be represented, for example, in the form of characters and/or symbols for the different regions of the display panel. Moreover, the production and the design of the display according to the invention is substantially simplified, since it requires a smaller number of focusing hoods and light guides by comparison with the known displays. The weight of the display is therefore simultaneously reduced. An optimum utilization of space and a maximum reduction in weight play a large role in motor vehicles, above all, with the result that the display according to the invention can be used here with particular advantage. At the same time, the invention substantially increases the ease with which the instruments can be surveyed and read off and thus—by distracting the vehicle driver less—the traffic safety.

The display can be read particularly well and has a high contrast when, advantageously, the display panel has a region which essentially blocks both passage of light of the first wavelength region and passage of light of the second wavelength region. In this case, complete blockage offers the highest contrast; however, a slight residual transmission can be provided in the blocked region, without lessening the advantages of the invention.

Virtually any sort of information can be represented alone or in combination with one another in accordance with a further advantageous development of the invention when the display panel has a region through which both light of the first wavelength region and light of the second wavelength region can pass. If information is visualized with the aid of arbitrary characters and/or symbols, it is also possible in the abovementioned, simple way for the characters and/or symbols which can be displayed to overlap.

The above-named object is also achieved according to the invention by virtue of the fact that the illuminating device can emit light of a first and/or a second light source, that a light filter is arranged between the illuminating device and the display field, and that the light of the first wavelength region can pass essentially only through a first region of the light filter, and the light of the second wavelength region can pass essentially only through a second region of the light filter differing at least partially from the first region of the light filter. If appropriate, it is also possible in this case to permit a slight residual transmission of light through a region through which it cannot pass, in order to keep the production cost of the display low.

This display according to the invention has advantages, corresponding to the first invention, of a simple, weight saving design, requiring few components, of a display which simultaneously offers a wide range of information in conjunction with a small display area. Moreover, in the case of the second display according to the invention, it is possible to display information in different colors in mutually separated regions of the display panel, without the need to use partitions between light sources of different color for illuminating the display panel. In this case, the different color regions can be established only as a function of the configuration of the light filter. If a variation in the provision of the color regions is to be undertaken, there is no need—as there is with earlier displays—for repositioning partitions, which means high tooling costs, but only a need to use a modified light filter.

In accordance with an advantageous development of the invention, the light filter is a color filter pane, as a result of which a particularly compact display is obtained and a simple exchange of the light filter, and its cost-effective production are ensured.

A particularly uniform illumination of the display panel is achieved when the light filter is a scatter filter. In this case, the light filter can have uniform scattering properties over its entire light-transmitting surface, or the diffusion can be matched to the desired illumination of regions of the display panel.

A particularly contrasting display results when, in accordance with another development of the invention, the light filter has a region which essentially blocks both passage of light of the first wavelength region and passage of light of the second wavelength region. It can be permissible in this case, if appropriate, for the blocking region to permit a low residual transmission of light, for example for the purpose of generating a colored display background.

If, in accordance with another advantageous development of the invention, the light filter has a region through which both light of the first wavelength region and light of the second wavelength region can pass, the multiplicity of the display can thereby be further increased by permitting mutually overlapping representations of information.

It is conceivable that the wavelength regions in the displays according to the invention overlap considerably, with the result that in the case of a display of the different items of information in a display panel the further information is indicated, in addition to the one item represented primarily, in the background, for example with the aid of lesser light transmission. It is possible in this way to display functions which are available to an operator as an alternative to the selection made. For example, in the case of a display for a radio set, the designation "VHF" for the selected frequency range can appear brightly lit in the display panel, but at the same time an alternatively selectable frequency range can be offered to the operator by means of a designation "MW" which appears in the same display panel but does so only with a lower luminosity.

In accordance with another advantageous development of the invention, by contrast, the first wavelength region and the second wavelength region of the light emitted by the illuminating device have essentially different wavelengths, with the result that the different items of information are displayed in a fashion clearly separated from one another.

The different items of information which can be represented in the various regions of the display panel can be detected by an observer particularly quickly and reliably when they are displayed in unambiguously detectable colors with a high distinguishing power. Consequently, in accordance with a particularly advantageous development of the invention, one of the wavelength regions covers approximately blue light and/or one of the wavelength regions covers approximately green light and/or one of the wavelength regions covers approximately red light.

These wavelength regions can be combined with one another in any desired way. In the case of a display for a motor vehicle, it is, for example, advantageous to signal the selection of main beam in a blue display panel, and the selection of headlight (dipped beam) in a green color in the same display panel. A combination of a green and a red illumination of a display panel preferably serves the purpose of signaling the presence of a variable (for example cooling-water temperature) in the normal operating range, whereas the display panel is illuminated in red upon overshooting of an upper range limit (for example permissible maximum temperature). However, it would also be possible to provide a color change of blue (cold)/red (hot) for this purpose. Moreover, it is also conceivable to illuminate a display panel optionally in one of three colors (blue, green, red) whose wavelengths are clearly separated from one another, in which case, for example, in the display panel green is displayed as a symbol for the selection of headlight, blue is displayed as a symbol for the selection of main beam, and red is displayed as a symbol for signaling a fault in the vehicle lighting system.

According to another advantageous development of the invention, for a contrasting representation which can be effectively perceived the blue light covers wavelengths from approximately 430 to 490 nm and/or the green light covers wavelengths from approximately 510 to 590 nm and/or the red light covers wavelengths from approximately 610 to 750 nm.

It is of prime importance for a clear representation on the display that the transmission of the various regions of the display panel for light of the various wavelength regions is clearly different. By contrast, the transmission for light of higher or lower wavelengths is of lesser importance. The design of the display according to the invention is therefore particularly simple and cost-effective when light of the lowest wavelength region and light of wavelengths therebelow can pass with high transmission through the region of the display panel or the light filter, through which light of the lowest of the wavelength regions can pass, and/or when light of the highest wavelength region and light of wavelengths thereabove can pass with high transmission through the region of the display panel or the light filter through which light of the highest of the wavelength regions can pass.

It is possible in principle to make use for the invention of any light sources (for example fluorescent tubes, EL foils, LEDs, incandescent lamps) alone or in combination with one another. It is also conceivable to use a single light source which can emit light of different wavelength depending on how it is driven. In accordance with an advantageous development of the invention, by contrast, the illuminating device has a light source from which light of the first wavelength region can be emitted, and a light source from which light of the second wavelength region can be emitted. It is possible in this way to implement displays which can be produced cost-effectively with particular ease and also in large batch numbers owing to the ease with which it is possible to match the transmission of the various regions of the display panel and the wavelengths of the light which can be emitted by the illuminating device.

A further enhancement of the display is achieved when, in accordance with a further advantageous development of the invention, the light sources are incandescent lamps.

By contrast, the illuminating device is particularly long-lasting and has only a slight power loss in the form of waste heat when the light sources advantageously have LED chips. In accordance with another advantageous development of the invention, in this case the two light sources are in each case integrated as an LED chip into a single multi-LED. This further diminishes the quantity of components in the display in a cost-reducing fashion.

The display panel could, for example, be a transparent pane printed in color with one or more symbols. However, changeable symbols and/or characters can advantageously be represented on the display panel. This is achieved in a favorable way by virtue of the fact that the display panel preferably has a liquid crystal display which can be illuminated by transmission or transflection.

It will be possible in this case to use a color display such that the transmission for light of the different wavelength regions can be switched in the various regions of the display panel. By contrast, the display is both particularly contrasting and also cost-effective when the liquid crystal display is a monochromatic display.

A particularly brightly shining display panel is achieved in accordance with another advantageous development of the invention by virtue of the fact that dark characters can be represented against a bright background on the display panel.

Particularly in the case of overwhelming use of a display according to the invention in dark surroundings, such a brightness can, however, lead to undesired dazzling effects. It is therefore furthermore a particular advantage when bright characters can be represented against a dark background on the display panel.

A particularly simple, cost-effective and weight-saving design of the display according to the invention results advantageously when the display panel is a dial for a motor vehicle instrument.

The readability of the displays according to the invention is further improved with the aid of another advantageous development of the invention by virtue of the fact that the transmission of the first region of the display panel or the light filter, and the transmission of the second region of the display panel or the light filter are matched in such a way that the brightness of the first region in the case of illumination with light of the first wavelength region corresponds approximately to the brightness of the second region in the case of illumination with light of the second wavelength region.

Undesired jumps in brightness which require adaptation of the human eye to the respective display brightness therefore do not occur. This is advantageous, in particular, whenever the transmissions of the various regions differ from one another by more than 10%. Matching the transmissions of the various regions can be achieved, for example, by a neutral overprint or half-tone overprint of different density, and thus of differing transmission.

A uniform brightness over the entire display panel independently of the illumination is achieved in accordance with a further advantageous development of the invention by a virtue of the fact that the transmission of the first region of the display panel or the light filter, and the transmission of the second region of the display panel or the light filter are matched to one another and to the transmission of the region of the display panel or the light filter through which both light of the first wavelength region and light of the second wavelength region can pass in such a way that the brightness of the individual regions is respectively approximately the same both in the case of illumination with light of the first wavelength region and in the case of illumination with light of the second wavelength region. This can be achieved in a particularly simple way, for example by virtue of the fact that—in a fashion oriented on the region with the lowest transmission—a reduction in transmission of the other regions, which originally have a higher transmission, is brought about by a neutral overprint of matched density. It is possible in this case for an identical transmission to be achieved over the entire display panel only with a very high technical outlay; consequently, the advantage is already achieved when the transmission differences of the individual regions are situated only insignificantly above the limit of perceptibility.

BRIEF DESCRIPTION OF THE DRAWING

The invention can be provided in very different ways. It is explained in more detail below with the aid of exemplary embodiments illustrated in the attached drawings. In the diagrammatic illustration of the figures of the drawings.

DETAILED DESCRIPTION OF THE PREFERRED EMBODIMENT

Figure 1:
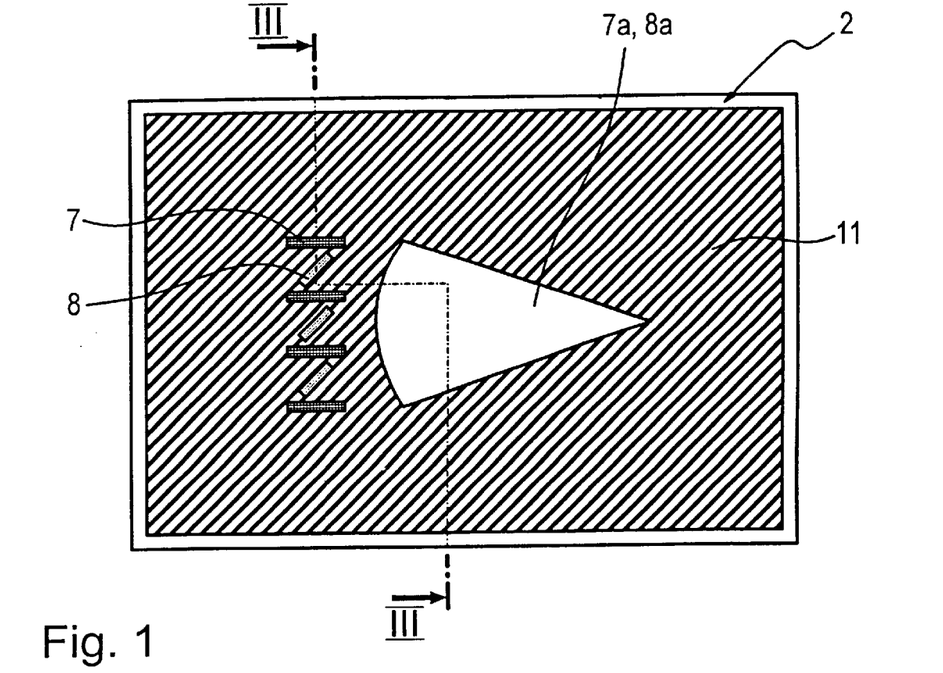
FIG. 1 shows a display panel of a display according to the invention, in plan view.

FIG. 1 shows a display panel 2 of a dial of a display (not illustrated further here) which is a combination instrument of a motor vehicle. A symbol for selected main beam, or a symbol for selected headlights (dipped beam) of the vehicle can optionally be displayed on the display field 2 in a negative representation, that is to say the symbol appears bright against a dark display background.

Figure 3:
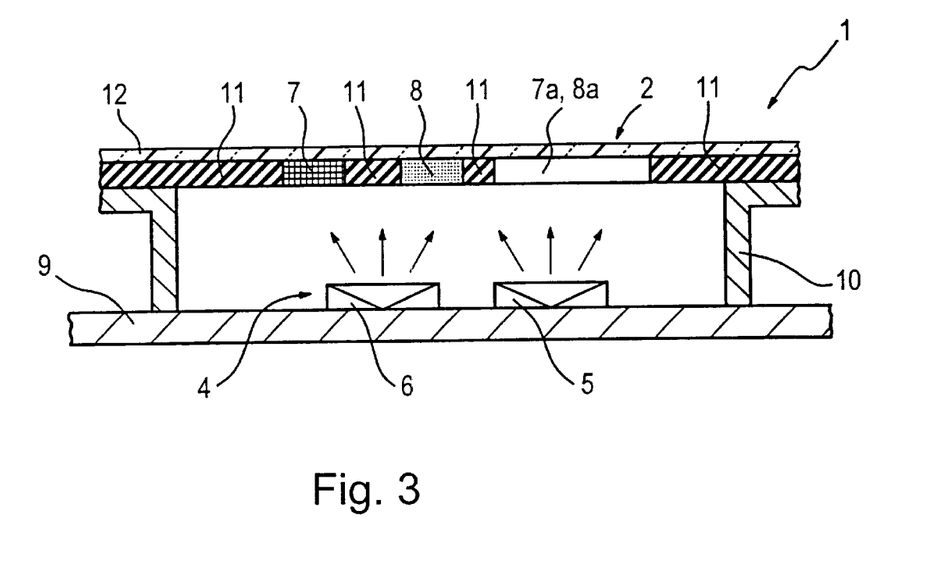
FIG. 3 shows a section of the display from FIG. 1, along the line III—III.

It is to be seen in FIG. 3, in a corresponding sectional illustration, that an illuminating device 4, having two light sources 5, 6 in the form of LEDs, for transilluminating the display panel 2 is arranged on a printed circuit board 9 of the display 1. Blue light of a first wavelength region can be emitted by the first light source 5, and green light of a second wavelength region can be emitted by the second light source 6. A housing 10 constructed as a focusing hood increases the light fraction of the illuminating device 4 which is useful for illuminating the display panel 2, and shields the light emitted by said device with respect to further parts of the display 1. On the side of the housing 10 averted from the illuminating device 4, the display panel 2 is arranged in a dial of the combination instrument which consists of a transilluminable foil 12 printed on the rear.

The display panel 2 has various regions, respectively applied as a print to the foil 12: the blue light of the first light source 5 can pass through a first region 7, 7a. For this purpose, a subregion 7, consisting of bars arranged approximately parallel to one another and horizontally, of the first region 7, 7a has a blue overprint matched to the light of the first light source 5, and a subregion 7a, in the shape of a circular segment, has no overprint of any sort.

A second region 8, 8a of the display panel 2 is provided in a subregion 8 consisting of bars arranged approximately parallel to one another and at an angle of 45° to the horizontal, with a green overprint corresponding to the illuminating color of the second light source 6, and with no overprint of any sort in a subregion 8a, in the shape of a circular segment and overlapping with the subregion 7a of the first region 7, 7a, of the second region 8, 8a.

A remaining region 11, forming the background, of the display panel 2 blocks light from passing, and is provided for this purpose with a black overprint. The blue overprint of the first region 7 of the display panel 2 is opaque to light of greater wavelength (and thus also to the right emitted by the second, green-shining light source 6). The green overprint of the second region 8 of the display panel 2 is, by contrast, opaque to light of lesser wavelength, including the blue light emitted by the first light source 5.

Thus, when the first, blue-shining light source 5 is switched on, light passes only through the first region 7, 7a of the display panel 2; a blue-shining display symbol for selected main beam can be detected by an observer against a dark display background. In the case of a shining second light source 6, emitting green light, only the second region 8, 8a of the display panel 2 is transilluminated. The observer detects in front of a dark display background a green-shining symbol which signals the selected headlight.

In addition, the entire display panel 2 including the transilluminable regions 7, 7a, 8, 8a can be provided on its front side facing the viewer with a neutral overprint for producing a black-panel effect.

Figure 2:
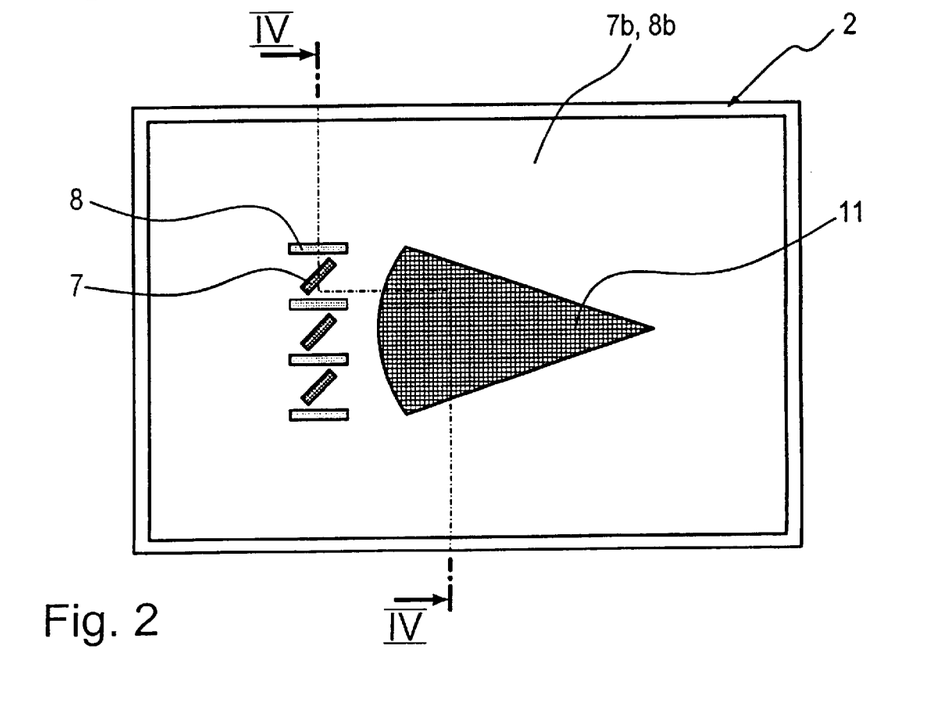
FIG. 2 shows a display panel of a second display according to the invention, in plan view.
Figure 4:
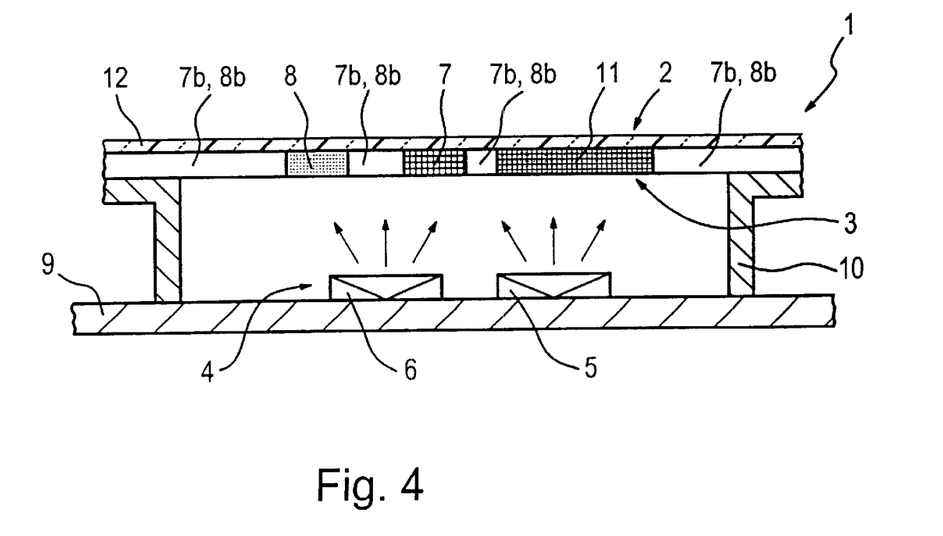
FIG. 4 shows a section of the display from FIG. 2, along the line IV—IV.

A display 1 with a display panel 2 on which it is possible to represent symbols corresponding to FIGS. 1, 3 in the form of dark characters against a bright background, is shown in FIGS. 2, 4, use being made—as also in the following figures—of the same reference numbers for components corresponding to one another. Here, once again, blue light can be emitted by a first light source 5, and green light can be emitted by a second light source 6. The display panel 2 of a dial overprinted on the rear and having a transilluminable foil 12 is provided on its rear side in a subregion 11 with a blocking overprint which prevents passage of blue and green light.

Moreover, the display panel 2 has a region 7, 7b which permits passage of light of blue color and has a first subregion 7, overprinted in blue, and a second subregion 7b, which is not overprinted. The green light of the second light source 6 can pass through a further region 8, 8b, which comprises a first subregion 8 with green overprinting, and a second subregion 8b without overprinting. The display background is formed here by the two subregions 7b, 8b, having no overprinting, of the first region 7, 7b and of the second region 8, 8b of the display panel 2.

In the case of this display, when a blue light source 5 is switched on light passes through the first region 7, 7b of the display panel 2, the viewer being able to detect a dark symbol, signaling a selected main beam, against a blue-shining display background. By contrast, when a green-shining light source 6 is switched on a dark symbol, signaling a selected headlight, appears against a green background.

Figure 5:
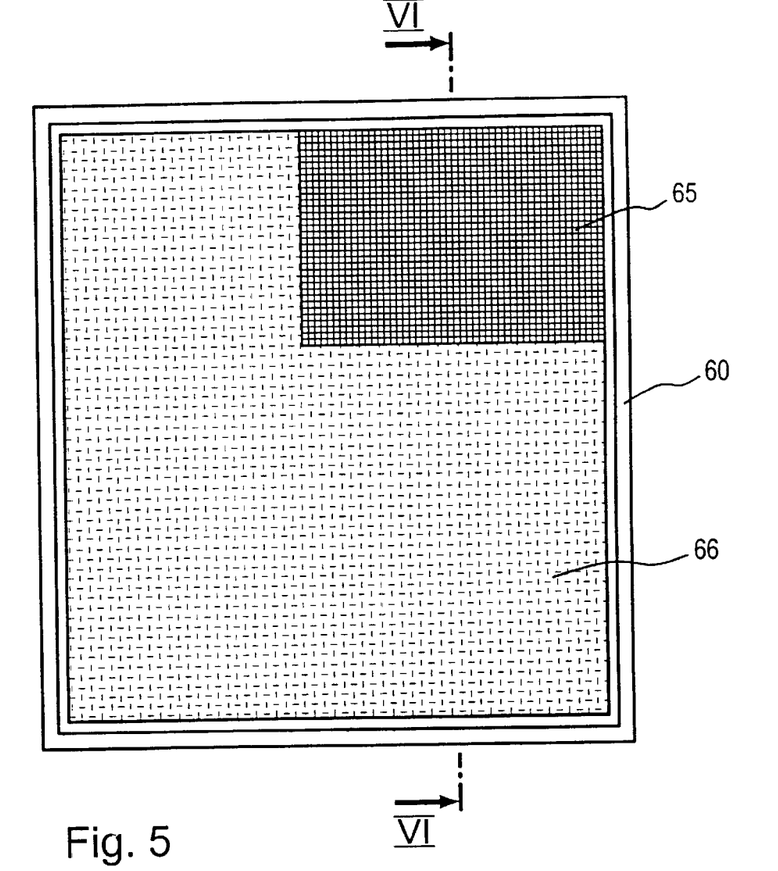
FIG. 5 shows a display panel of a further display according to the invention, in plan view.
Figure 6:
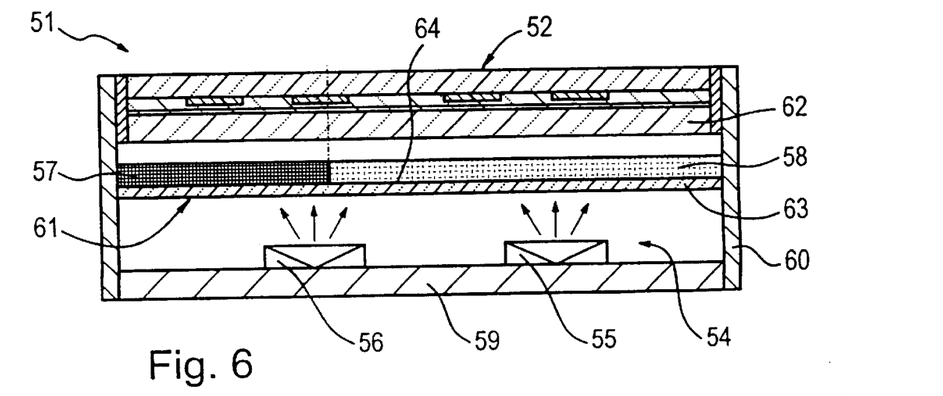
FIG. 6 shows a section of the display from FIG. 5, along the line VI—VI.

A further display 51 is illustrated in FIGS. 5, 6. The display 51, which, for example, can be a component of a combination instrument of a motor vehicle, or be installed in the center console of a motor vehicle, has a display panel 52 with a liquid crystal display 62. On a printed circuit board 59 of the display 51 which is arranged on the rear side, averted from an observer, of the display panel 52 there is arranged a first, blue-light emitting light source 55, and a second light source 56, which can emit green light, of an illuminating device 54 for transmissive illumination of the liquid crystal display 62 of the display panel 52.

A light filter 61 is arranged between the illuminating device 54 and the display panel 52. The liquid crystal display 62, light filter 61 and printed circuit board 59 of the display 51 are installed in a housing 60.

The light filter 61 comprises a transparent pane 63 which is overprinted on its front side 64 facing the display panel 52 in a fashion forming a first region 57 and a second region 58 of the light filter 61. In this case, the first region 57 has a blue overprint transparent to the light of the first light source 55, and the second region 58 has a green overprint transparent to the light of the second light source 56.

Moreover, the first region 57 of the light filter 61 blocks passage of green light, and the second region 58 of the light filter 61 blocks passage of blue light. Consequently, when the first light source 55 is switched on only the first subregion 57 of the light filter 61, and a first sector 65, opposite this region 57, of the liquid crystal display 62 are transilluminated. By contrast, transillumination of the second region 58 of the light filter 61 and of a second sector 66, situated opposite the latter, of the liquid crystal display 62 is performed, by contrast, only when the second light source 56 is switched on. It is very easily possible in this way without the assistance of light partitions to illuminate various regions of a display panel optionally in different colors.

In the case of the display 51 described here, the first sector 65 of the liquid crystal display 62 can be illuminated with blue light, and the second sector 66 of the liquid crystal display 62 can be illuminated with green light. In the case when both light sources 55, 56 are switched on at the same time, the entire liquid crystal display 62 is illuminated, the first sector 65 appearing blue, and the second sector 66 appearing green.

Figure 7:
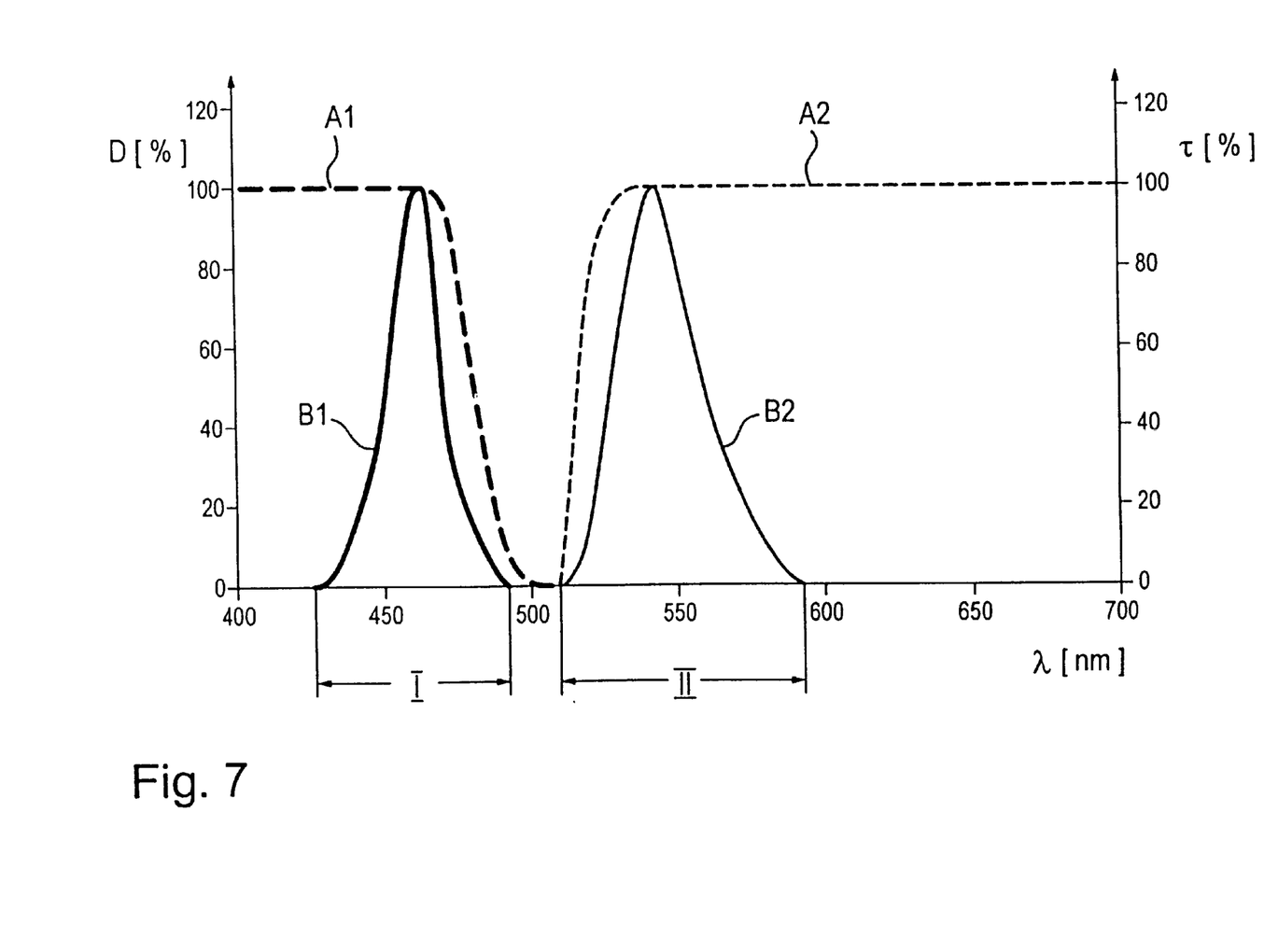
FIG. 7 shows emission spectra of an illuminating device, and transmission spectra of regions of display panels of the displays from FIGS. 1, 2, 5.

In order to illustrate the mode of operation of displays prescribed for the respective illumination, FIG. 7 shows in a diagram plots, against the wavelength $\lambda$ of the light emitted by the illuminating devices, of the relative spectral radiance D (left-hand scale), on the one hand, and of the relative transmission $\tau$ (right-hand scale), on the other hand, of the various regions of the display panels and on the light filter, respectively.

It is to be seen that the illuminating device can emit light of a first wavelength region I with a wavelength of approximately 430 to 490 nm, and light of a second wavelength region II with a wavelength of approximately 510 to 590 nm. The spectral curve B1 of the first wavelength region I, and the spectral curve B2 of the second wavelength region II do not overlap and drop away steeply above and below their respective peak value of approximately 460 nm and approximately 540 nm, respectively.

Also drawn in are the transmission curves A1 of the regions, provided with a blue overprint, of the display panels or of the light filter, and A2, of the regions, provided with a green overprint, of the display panels or of the light filter. It is to be seen that the blue light of the wavelength region I is certainly capable of completely penetrating the blue-overprinted regions, but that, by contrast, it is completely blocked by the green-overprinted regions. The behavior is exactly the reverse in the case of the green light of the wavelength region II.

What is claimed is:

1. A display, in particular for a motor vehicle, having a transilluminable display panel and an illuminating device, arranged on a rear side of the display panel averted from an observer, for transilluminating the display panel, wherein the illuminating device (4) can emit light of a first (I; light source 5) and/or a second (II; light source 6) wavelength region, and wherein the light of the first wavelength region (I) can essentially pass through only a first region (7, 7a, 7b) of the display panel (2), and the light of the second wavelength region (II) can essentially pass through only a second region (8, 8a, 8b) of the display panel (2) which differs at least partially from the first region (7, 7a, 7b) and at least partially overlaps the first region of the display panel (2).

2. The display as claimed in claim 1, wherein said display panel (2) has a region (11) which essentially blocks both passage of light of the first wavelength region (I) and passage of light of the second wavelength region (II).

3. The display as claimed in claim 1, wherein the display panel (2) has a region (7a, 8a; 7b, 8b) through which both light of the first wavelength region (I) and light of the second wavelength region (II) can pass.

4. The display as claimed in claim 1, wherein the first wavelength region (I) and the second wavelength region (II) of the light emitted by the illuminating device (4) have essentially different wavelengths.

5. The display as claimed in claim 1, wherein one of the wavelength regions (I) covers approximately blue light.

6. The display as claimed in claim 5, wherein the wavelength region (I) covers wavelengths from approximately 430 to 490 nm.

7. The display as claimed in claim 1, wherein one of the wavelength regions (II) covers approximately green light.

8. The display as claimed in claim 7, wherein the wavelength region (II) covers wavelengths from approximately 510 to 590 nm.

9. The display as claimed in claim 1, wherein one of the wavelength regions covers approximately red light.

10. The display as claimed in claim 9, wherein said one of the wavelength regions covers wavelengths from approximately 610 to 750 nm.

11. The display as claimed in claim 1, wherein light of a lowest wavelength region (I) and light of wavelengths therebelow can pass with high transmission through the region (7, 7a, 7b) of the display panel (2), through which light of the lowest (I) of the wavelength regions (I, II) can pass.

12. The display as claimed in claim 1, wherein light of a highest wavelength region (II) and light of wavelengths thereabove can pass with high transmission through the region (8, 8a, 8b) of the display panel (2) through which light of the highest (II) of the wavelength regions (I, II) can pass.

13. The display as claimed in claim 1, wherein the illuminating device (4) has a light source (5) from which light of the first wavelength region (I) can be emitted, and a light source (6) from which light of the second wavelength region (II) can be emitted.

14. The display as claimed in claim 13, wherein said light sources are incandescent lamps.

15. The display as claimed in claim 13, wherein said light sources (5, 6) have Light Emitting Diode (LED) chips.

16. The display as claimed in claim 15, wherein said two light sources are in each case integrated as an LED chip into a single multi-LED.

17. The display as claimed in claim 1, wherein the display panel (2) has a liquid crystal display which can be illuminated by transmission or transflection.

18. The display as claimed in claim 17 wherein the liquid crystal display is a monochromatic display.

19. The display as claimed in claim 1, wherein bright characters are representable against a dark background on the display panel (2).

20. The display as claimed in claim 1, wherein dark characters are representable against a bright background on the display panel (2).

21. The display as claimed in claim 1, wherein the display panel (2; 52) is a dial for a motor vehicle instrument.

22. The display as claimed in claim 1, wherein the transmission of the first region (7, 7a, 7b) of the display panel (2), and the transmission of the second region (8, 8a, 8b) of the display panel (2) are matched such that the brightness of the first region (7, 7a, 7b) in case of illumination with light of the first wavelength region (I; light source 5) corresponds approximately to the brightness of the second region (8, 8a, 8b) in case of illumination with light of the second wavelength region (II; light source 6).

23. The display as claimed in claim 1, wherein the transmission of the first region (7) of the display panel (2) and the transmission of the second region (8) of the display panel (2) are matched to one another and to the transmission of the region (7a, 8a; 7b, 8b) of the display panel (2) through which both light of the first wavelength region (I) and light of the second wavelength region (II) can pass such that the brightness of the individual regions (7; 8; 7a, 8a; 7b, 8b) is respectively approximately the same both in case of illumination with light of the first wavelength region (I) and in case of illumination with light of the second wavelength region (II).

24. A display, in particular for a motor vehicle, having a transilluminable display panel and an illuminating device, arranged on a rear side of the display panel averted from an observer, for transilluminating the display panel, wherein the illuminating device (54) can emit light of a first (I; light source 55) and/or a second (II; light source 56) wavelength region, wherein a light filter (61) is arranged between the illuminating device (54) and a display field (52), and wherein the light of the first wavelength region (I) can pass essentially only through a first region (57) of the light filter (61), and the light of the second wavelength region (II) can pass essentially only through a second region (58) of the light filter (61) differing at least partially from the first region (57) of the light filter (61), and wherein a portion of the light filter illuminated by the light of the first wavelength region overlaps a portion of the light filter illuminated by the light of the second wavelength region.

25. The display as claimed in claim 24, wherein said light filter (61) is a color filter pane.

26. The display as claimed in claim 24, wherein the light filter (61) is a scatter filter.

27. The display as claimed in claim 24, wherein the light filter (61) has a region which essentially blocks both passage of light of the first wavelength region (I) and passage of light of the second wavelength region (II).

28. The display as claimed in claim 24, wherein the light filter (61) has a region through which both light of the first wavelength region (I) and light of the second wavelength region (II) can pass.

29. The display as claimed in claim 24, wherein the first wavelength region (I) and the second wavelength region (II) of the light emitted by the illuminating device (54) have essentially different wavelengths.

30. The display as claimed in claim 24, wherein one of the wavelength regions (I) covers approximately blue light.

31. The display as claimed in claim 30, wherein the wavelength region (I) covers wavelengths from approximately 430 to 490 nm.

32. The display as claimed in claim 24, wherein one of the wavelength regions (II) covers approximately green light.

33. The display as claimed in claim 32, wherein the wavelength region (II) covers wavelengths from approximately 510 to 590 nm.

34. The display as claimed in claim 24, wherein one of the wavelength regions covers approximately red light.

35. The display as claimed in claim 34, wherein said one of the wavelength regions covers wavelengths from approximately 610 to 750 nm.

36. The display as claimed in claim 24, wherein light of a lowest wavelength region (I) and light of wavelengths therebelow can pass with high transmission through the region (57) of the light filter (61), through which light of the lowest (I) of the wavelength regions (I, II) can pass.

37. The display as claimed in claim 24, wherein light of a highest wavelength region (II) and light of wavelengths thereabove can pass with high transmission through the region (58) of the light filter (61) through which light of the highest (II) of the wavelength regions (I, II) can pass.

38. The display as claimed in claim 24, wherein the illuminating device (54) has a light source (55) from which light of the first wavelength region (I) can be emitted, and a light source (56) from which light of the second wavelength region (II) can be emitted.

39. The display as claimed in claim 38, wherein the light sources are incandescent lamps.

40. The display as claimed in claim 38, wherein the light sources (55, 56) have LED chips.

41. The display as claimed in claim 40, wherein the two light sources are in each case integrated as an LED chip into a single multi-LED.

42. The display as claimed in claim 24, wherein the display panel (52) has a liquid crystal display (62) which can be illuminated by transmission or transflection.

43. The display as claimed in claim 42, wherein the liquid crystal display (62) is a monochromatic display.

44. The display as claimed in claim 24, wherein bright characters are representable against a dark background on the display panel (52).

45. The display as claimed in claim 24, wherein dark characters are representable against a bright background on the display panel (52).

46. The display as claimed in claim 24, wherein the display panel (52) is a dial for a motor vehicle instrument.

47. The display as claimed in claim 24, wherein the transmission of the first region (57) of the light filter (61), and the transmission of the second region (58) of the light filter (61) are matched such that the brightness of the first region (57) in case of illumination with light of the first wavelength region (I; light source 55) corresponds approximately to the brightness of the second region (58) in case of illumination with light of the second wavelength region (II; light source 56).

48. The display as claimed in claim 24, wherein the transmission of the first region (57) of the the light filter (61), and the transmission of the second region (58) of the light filter (61) are matched to one another and to the transmission of the region of the light filter (61) through which both light of the first wavelength region (I) and light of the second wavelength region (II) can pass such that the brightness of the individual regions (57; 58) is respectively approximately the same both in case of illumination with light of the first wavelength region (I) and in case of illumination with light of the second wavelength region (II).

* * * * *